(12) United States Patent
Nishita et al.

(10) Patent No.: US 7,446,863 B2
(45) Date of Patent: Nov. 4, 2008

(54) AUTOMATIC COLLIMATION DEVICE FOR SURVEYING APPARATUS

(75) Inventors: Nobuyuki Nishita, Kanagawa (JP); Satoshi Yasutomi, Kanagawa (JP)

(73) Assignee: Sokkia Co., Ltd., Kanagawa (JP)

( * ) Notice: Subject to any disclaimer, the term of this patent is extended or adjusted under 35 U.S.C. 154(b) by 0 days.

(21) Appl. No.: 11/565,311

(22) Filed: Nov. 30, 2006

(65) Prior Publication Data
US 2007/0182952 A1      Aug. 9, 2007

(30) Foreign Application Priority Data
Feb. 9, 2006      (JP)      ............... 2006-032513

(51) Int. Cl.
*G01B 11/26* (2006.01)
(52) U.S. Cl. .................. 356/139.04; 356/614; 382/103
(58) Field of Classification Search ............ 356/139.04, 356/614; 382/103
See application file for complete search history.

(56) References Cited

U.S. PATENT DOCUMENTS 6,137,569 A * 10/2000 Sasaki et al. ................ 356/153
6,295,083 B1 * 9/2001 Kuhn ........................ 348/190
6,963,657 B1 * 11/2005 Nishigaki et al. ........... 382/106
2004/0061712 A1 * 4/2004 Sogawa ...................... 345/698

* cited by examiner

*Primary Examiner*—Thomas H Tarcza
*Assistant Examiner*—Timothy A Brainard
(74) *Attorney, Agent, or Firm*—Roberts Mlotkowski Safran & Cole, P.C.; Thomas W. Cole (57) ABSTRACT

A surveying apparatus that is capable of automatic collimation based on an image obtained from an imaging device, which enables carrying out automatic collimation without using angle detectors, even when a telescope is rotating. An automatic collimation device for a surveying apparatus including: an imaging device that images a target (11) captured by a telescope and surroundings of the target; a drive unit that rotates the telescope; a light emitting unit that sends light toward the target; and an arithmetic control unit that determines a position of the target based on a difference between a lit image (a) obtained when the light emitting unit has been turned on and an unlit image (b) obtained when the light emitting unit has been turned off and controls the drive unit to automatically collimate the target, wherein the arithmetic control unit determines, while shifting either the lit image or unlit image little by little (C), a position where both images are most coincident (D), and determines a position of the target based on a difference between both images at the position (E).

5 Claims, 12 Drawing Sheets

AUTOMATIC COLLIMATION DEVICE FOR SURVEYING APPARATUS

TECHNICAL FIELD

The present invention relates to an automatic collimation device for a surveying apparatus that includes an imaging device such as a CCD area sensor so that a target can be automatically collimated based on an image obtained from the imaging device.

BACKGROUND ART

Recently, a surveying apparatus structured so that a target can be automatically collimated based on an image obtained from an imaging device has also started to be used. As such a surveying apparatus, one as disclosed in the following Patent Document 1 has been known. This is shown in FIG. 11 and FIG. 12.

Figure 11:
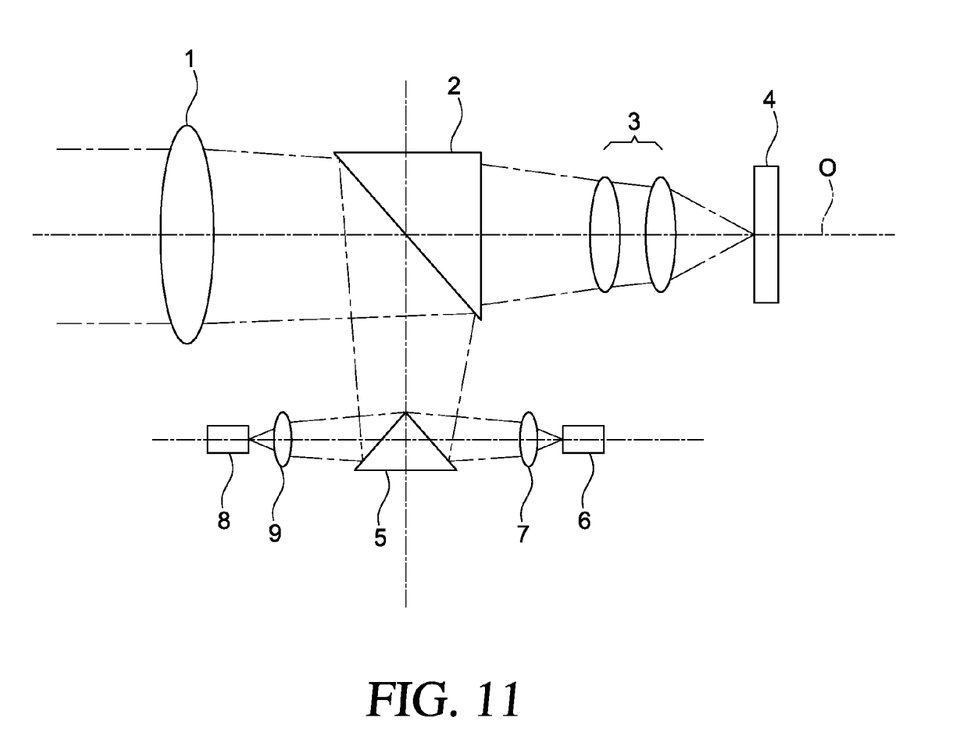
[FIG. 11] A diagram for explaining an optical system of a conventional surveying apparatus with an imaging device.

The surveying apparatus includes, as shown in FIG. 11, a telescope composed of an object lens 1, a dichroic mirror 2, a condenser lens 3, and a solid-state image pickup device 4 on a collimation axis (optical axis) O, and a light that has penetrated through the object lens 1, dichroic mirror 2, and condenser lens 3 is focused on the solid-state image pick device 4.

In addition, the surveying apparatus has a light emitting unit 6, and a modulated light emitted by the light emitting unit 6 is sent along the collimation axis O through a condenser lens 7, a triangular mirror 5, dichroic mirror 2, and object lens 1. The modulated light that has been sent along the collimation axis O returns along the collimation axis O as a result of being reflected on a target prism (hereinafter, simply described as a target) disposed at a point of measurement, penetrates through the object lens 1, dichroic mirror 2, and condenser lens 3, and is made incident onto the solid-state image pickup device 4. A part of the modulated light is reflected on the dichroic mirror 2 and triangular mirror 5 and is made incident into a light receiving unit 8 through a condenser lens 9.

In the surveying apparatus, a phase difference between the modulated light emitted by the light emitting unit 6 and the modulated light made incident into the light receiving unit 8 is determined by an unillustrated phase meter, and based on the phase difference, a distance to the target is calculated by an unillustrated arithmetic control unit. At this time, a horizontal angle as well as a vertical angle of the telescope (a collimation axis) are measured by an unillustrated horizontal measuring unit (horizontal encoder) and vertical angle measuring unit (vertical encoder).

Meanwhile, when measuring the distance and angles, the target must be collimated so that this is accurately positioned on the collimation axis O. This collimation is automatically carried out as follows.

Figure 12A:
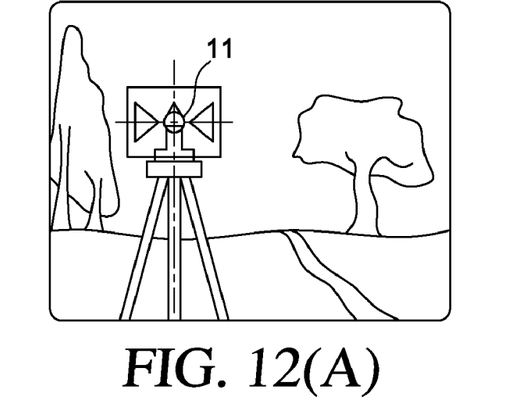
[FIG. 12] Views for explaining principles of an automatic collimation device for a conventional surveying apparatus with an imaging device.
Figure 12B:
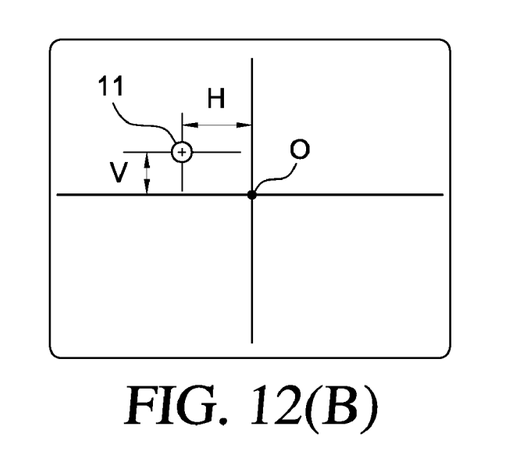

First, the telescope is turned to a target 11, and in terms of an image including the target 11 as shown in FIG. 12(A), a lit image when the light emitting unit 6 has been made to emit light and an unlit image when the light emitting unit 6 has been turned off are obtained by the solid-state image pickup device 4. Then, by the unillustrated arithmetic control unit, a difference between both images is determined. From the difference between both images, as shown in FIG. 12(B), an image of only the target 11 is obtained. This allows determining a horizontal deviation H and a vertical deviation V of the target 11 from the center of a screen indicating a collimation axis O direction. Then, by rotating the telescope by an unillustrated horizontal drive unit (horizontal servo motor) and vertical drive unit (vertical servo motor) until the horizontal deviation H and vertical deviation V become zero, the target 11 can be automatically collimated.

Figure 12C:
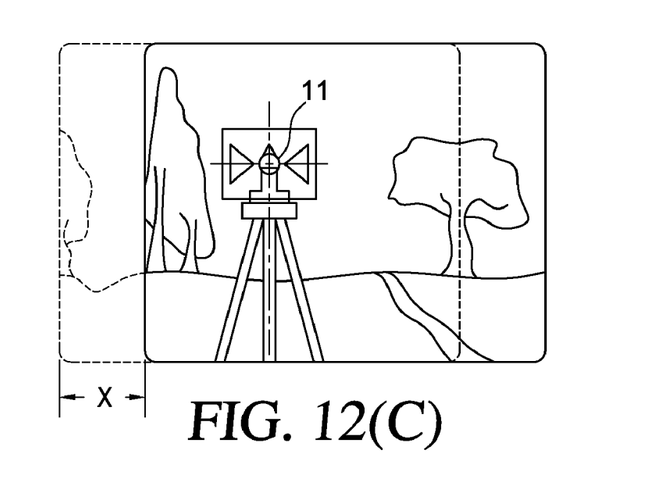

Although the foregoing collimation is carried out when the telescope stands still, automatic collimation can be carried out even when the telescope is rotating. The angle of rotation of the telescope is determined by counting the number of output pulses from the unillustrated horizontal angle measuring unit and vertical angle measuring unit. For example, if a difference in angle of the telescope between, while the surveying apparatus is horizontally rotating, when the light emitting unit 6 is made to emit light to obtain a lit image and when the light emitting unit 6 is turned off to obtain an unlit image is determined, a shift amount X (angle difference) between the lit image and unlit image can be easily calculated as shown in FIG. 12(C). When the shift amount X between the images has been determined, by determining a difference between both images by shifting either the lit image or unlit image by the shift amount X, the horizontal deviation H and vertical deviation V are easily determined, and the target 11 can be automatically collimated.

As such, since the surveying apparatus disclosed in the following Patent Document 1 is capable of carrying out automatic collimation irrespective of whether the telescope is rotating or at a stand still, automatic collimation can be easily carried out at any time.

[Patent Document 1] Japanese Patent No. 3621123

DISCLOSURE OF THE INVENTION

Problems to be Solved by the Invention

The one disclosed in the above-described Patent Document 1 determines the shift amount X between the lit image when the light emitting unit 6 is made to emit light and unlit image when the light emitting unit 6 is turned off by use of angle detectors such as a horizontal encoder and a vertical encoder, however, like levels (leveling instruments), some surveying apparatuses do not include angle detectors such as encoders. The surveying apparatus disclosed in the above-described Patent Document 1 has had a problem such that, without angle detectors, automatic collimation cannot be carried out when the telescope is rotating.

In order to solve the problems as described above, it is therefore an object of the present invention, in a surveying apparatus that is capable of automatic collimation based on an image obtained from an imaging device, to enable carrying out automatic collimation without using angle detectors, even when a telescope is rotating.

Means for Solving the Problems

In order to achieve the above object, the invention according to claim 1 is characterized in that, in an automatic collimation device for a surveying apparatus including: an imaging device that images a target captured by a telescope and surroundings of the target; a drive unit that rotates the telescope; a light emitting unit that sends light toward the target; and an arithmetic control unit that determines a position of the target based on a difference between a lit image obtained as a result of imaging by the imaging device when the light emitting unit has been turned on and an unlit image obtained as a result of imaging by the imaging device when the light emitting unit has been turned off and controls the drive unit to automatically collimate the target, the arithmetic control unit carries out a correlation operation between the lit image and unlit image so as to determine a position where both images are most coincident, and determines a position of the target based on a difference between both images at the position.

The invention according to claim 2 is characterized in that, in the invention according to claim 1, the position where both images are most coincident is judged to be when, in the course of a correlation operation between the lit image and unlit image to determine a correlation regarding brightness of overlapping pixels between both images, the correlation has been maximized.

The invention according to claim 3 is characterized in that, in the invention according to claim 1, the position where both images are most coincident is judged to be when, in the course of a correlation operation between the lit image and unlit image in a transverse direction to determine, in overlapping parts between both images, a correlation regarding a sum total of brightness of overlapping pixels on a straight line along a longitudinal direction between both images, the correlation has been maximized.

The invention according to claim 4 is characterized in that, in the invention according to claim 1, the position where both images are most coincident is judged to be when, in the course of a correlation operation between the lit image and unlit image in a longitudinal direction to determine, in overlapping parts between both images, a correlation regarding a sum total of brightness of overlapping pixels on a straight line along a transverse direction between both images, the correlation has been maximized.

The invention according to claim 5 is characterized in that, in the invention according to claim 1, 2, 3, or 4, the correlation operation is carried out while shifting either the lit image or unlit image, and the range to be shifted at this time is limited to a range estimated from a control signal transmitted from the arithmetic control unit to the drive unit.

EFFECTS OF THE INVENTION

As is apparent from the above description, in the invention according to claim 1, a correlation operation between the lit image when the light emitting unit has been turned on and unlit image when the light emitting unit is turned off is carried out so as to determine a position where both images are most coincident, and a position of the target is determined based on a difference between both images at the position. Therefore, automatic collimation can be carried out without using angle detectors, even when the telescope is rotating. Consequently, it is convenient, even with an surveying apparatus without angle detectors, such as an electronic level etc., since automatic collimation can be carried out while rotating the telescope.

In the invention according to claim 2, furthermore, the position where both images are most coincident is judged to be when, in the course of a correlation operation between the lit image and unlit image to determine a correlation regarding brightness of overlapping pixels between both images, the correlation has been maximized. Therefore, the position where both images are most coincident can be determined easily and reliably, thus the same effects as those of the invention according to claim 1 can be provided more easily and reliably.

In the invention according to claim 3, the position where both images are most coincident is judged to be when, in the course of a correlation operation between the lit image and unlit image in a transverse direction to determine, in overlapping parts between both images, a correlation regarding a sum total of brightness of overlapping pixels on a straight line along a longitudinal direction between both images, the correlation has been maximized. Therefore, the transverse position where both images are most coincident can be determined with less computational complexity than that of the invention according to claim 2, thus automatic collimation can be more speedily carried out.

In the invention according to claim 4, the position where both images are most coincident is judged to be when, in the course of a correlation operation between the lit image and unlit image in a longitudinal direction to determine, in overlapping parts between both images, a correlation regarding a sum total of brightness of overlapping pixels on a straight line along a transverse direction between both images, the correlation has been maximized. Therefore, the longitudinal position where both images are most coincident can be determined with less computational complexity than that of the invention according to claim 2, thus automatic collimation can be more speedily carried out.

In the invention according to claim 5, furthermore, the correlation operation is carried out while shifting either the lit image or unlit image, and the range to be shifted at this time is limited to a range estimated from a control signal transmitted from the arithmetic control unit to the drive unit. Therefore, the time necessary to determine a correlation between both images is reduced, and the position where both images are most coincident can be determined to carry out automatic collimation more speedily.

BEST MODE FOR CARRYING OUT THE INVENTION

Figure 1:
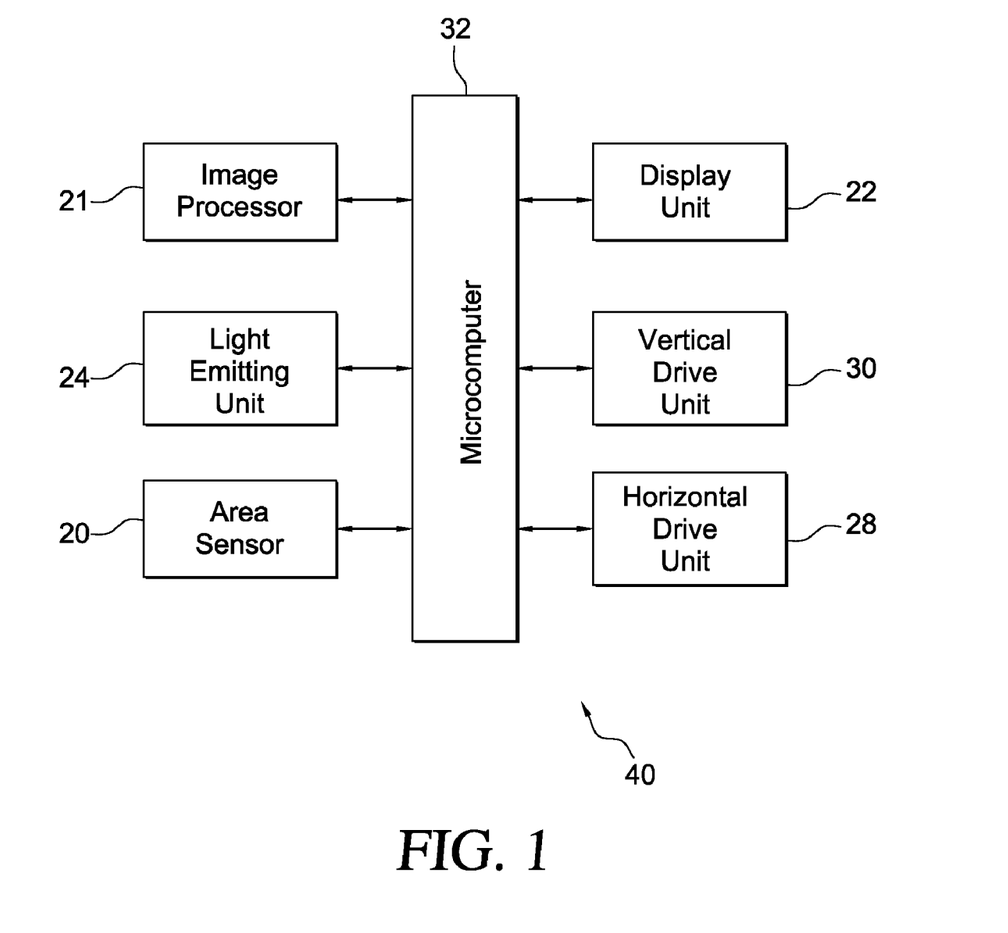
[FIG. 1] A block diagram of an automatic collimation device for a surveying apparatus, which is a first embodiment of the present invention.
Figure 2:
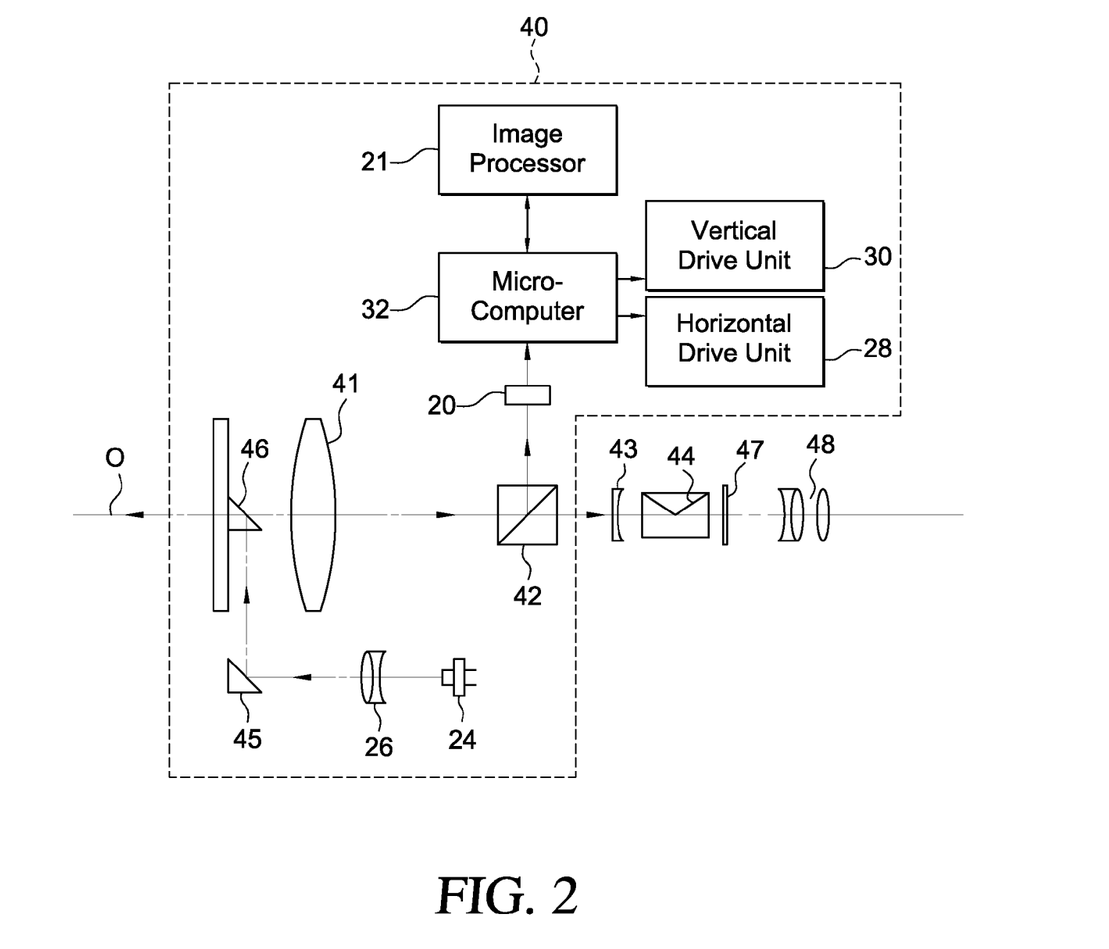
[FIG. 2] A diagram for explaining an optical system of the automatic collimation device.
Figure 3:
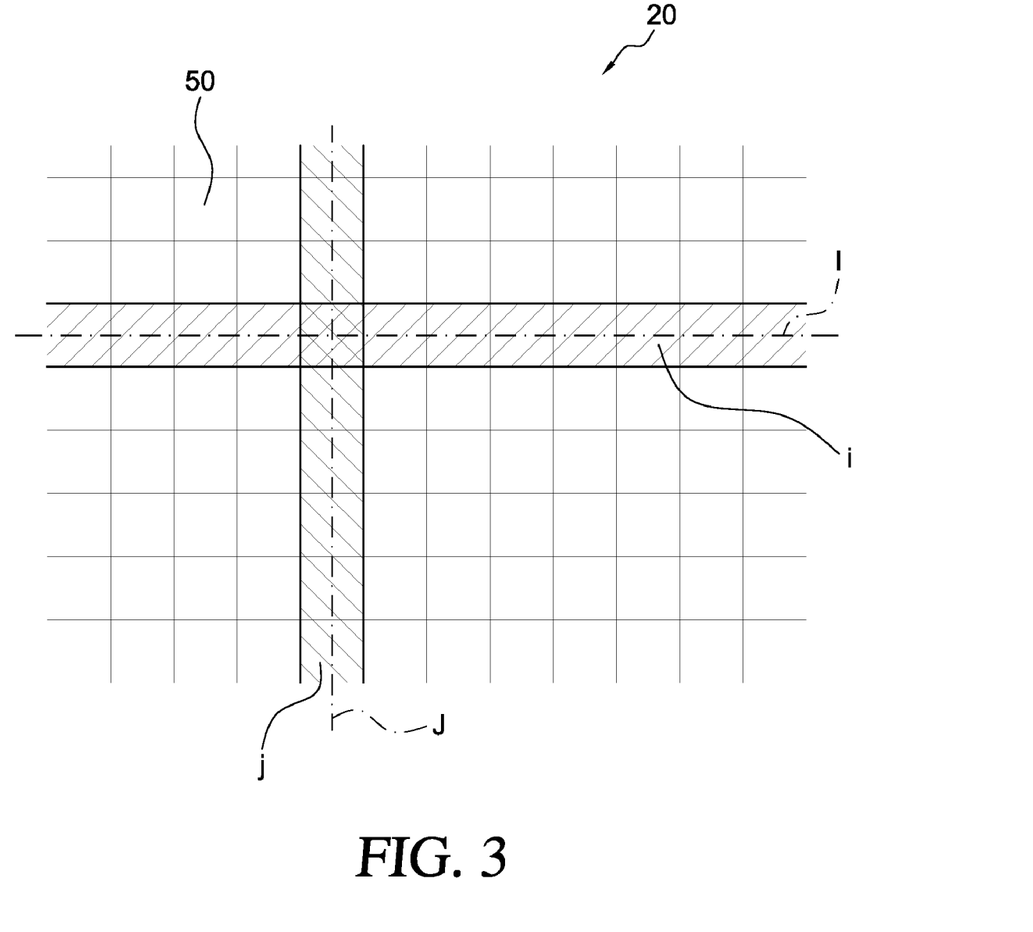
[FIG. 3] A plan view of an area sensor used for the automatic collimation device.
Figure 4:
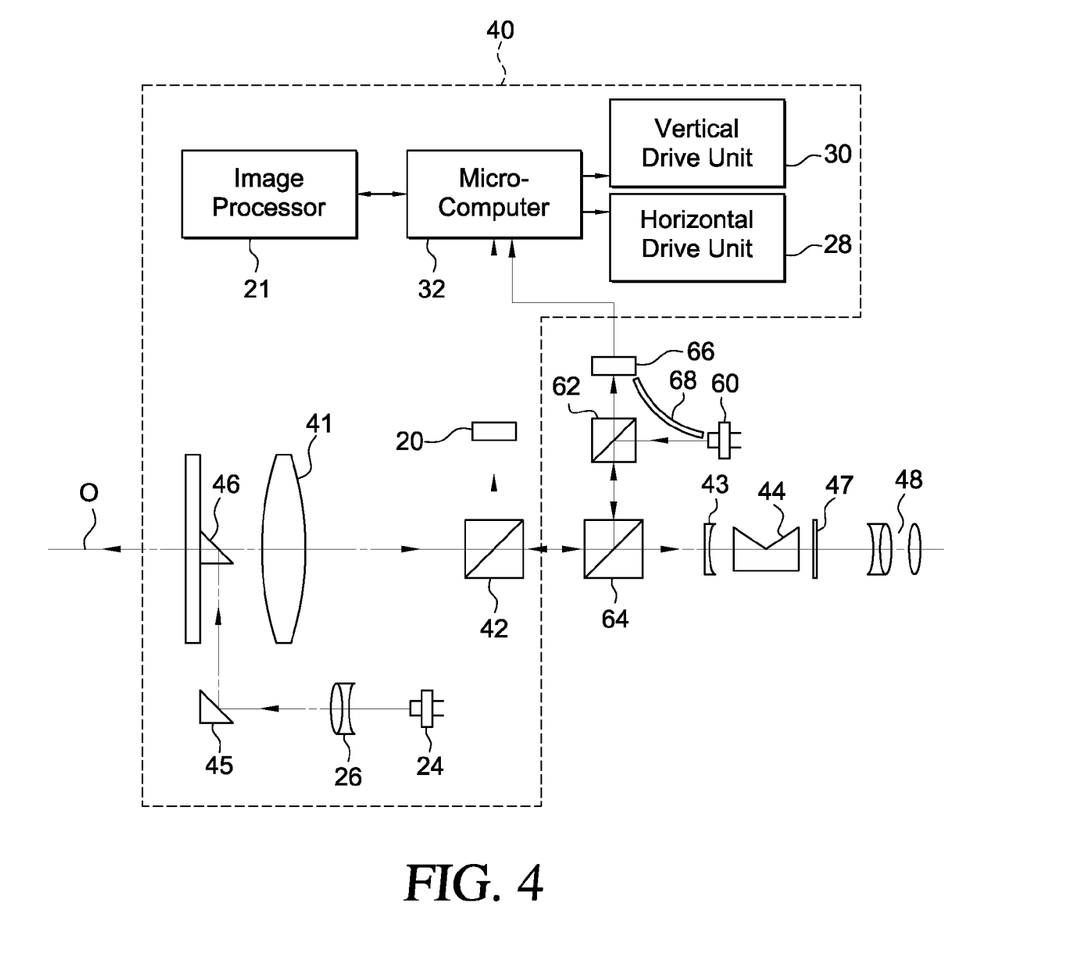
[FIG. 4] An optical system for which the automatic collimation device has been incorporated into a total station.

Hereinafter, a preferred embodiment of the present invention will be described in detail with reference to the accompanying drawings. First, based on FIG. 1 to FIG. 7, description will be given of an automatic collimation device for a surveying apparatus according to a first embodiment of the present invention. FIG. 1 is a block diagram of the automatic collimation device. FIG. 2 is a diagram for explaining an optical system of the automatic collimation device. FIG. 3 is a plan view of an area sensor used for the automatic collimation device. FIG. 4 is an optical system for which the automatic collimation device has been incorporated into a total station (combination electronic transit and electronic distance measuring device). FIG. 5 are views for explaining principles of the automatic collimation device. FIG. 6 is a diagram for explaining a correlation. FIG. 7 are views for explaining a method for determining a range by which a lit image and an unlit image are shifted when carrying out a correlation operation of both images.

As shown in FIG. 1, an automatic collimation device 40 of the present invention includes a light emitting unit 24 that emits collimation light, an area sensor 20 such as a CCD being an imaging device that receives the collimation light reflected on a target, an image processor 21 that processes an image obtained from the area sensor 20, and a horizontal drive unit 28 and a vertical drive unit 30 that rotate a telescope, and these are connected to a microcomputer (arithmetic control unit) 32. The microcomputer 32 controls the horizontal drive unit 28 and vertical drive unit 30, based on a target image processed by the image processor 21, so as to accurately coincide the target with the origin of coordinates of the area sensor 20. The microcomputer 32 is also connected with a display unit 22, and a measured value, an image obtained from the area sensor 20, and the like are displayed on the display unit 22.

As shown in FIG. 2, a telescope (collimating optical system) of the surveying apparatus is composed of an object lens 41, a focusing lens 43, an erecting prism 44, a reticle glass 47, and an ocular lens 48 arranged on a collimation axis (optical axis) O. An optical system of the automatic collimation device 40 is composed of the light emitting unit 24 that emits collimation light, a collimator lens 26 that collimates the collimation light into parallel light rays, a reflecting mirror 45 and a reflecting prism 46 that reflect the collimation light in directions on the square, the object lens 41, a dichroic prism 42, and the area sensor 20.

Since natural light condensed by the object lens 41 penetrates through the dichroic prism 42, a target image is focused onto the reticle glass 47. An operator can look into the target image through the ocular lens 48, and can perform a collimating operation by hand as well. On the other hand, collimation light emitted by the light emitting unit 24 passes through the collimator lens 26, is bent in its light path on the square by the reflecting mirror 45 and reflecting prism 46, and is sent along a collimation axis O. The sent collimation light returns along the collimation axis O as a result of being reflected on a target, is condensed by the object lens 41, is reflected in direction on the square by the dichroic prism 42, and is made incident into the area sensor 20.

The area sensor 20 is constructed, as shown in FIG. 3, by arranging pixels 50 in a grid pattern, and by designating a line i on a straight line I along the transverse direction and a row j on a straight line J along the longitudinal direction in order, the light amount, that is, brightness, received by each of all pixels 50 can be outputted into the microcomputer 32. An image including a target and a background obtained from the area sensor 20 can be displayed on the display unit 22 via the microcomputer 32.

FIG. 4 is an example of an optical system for which the automatic collimation device 40 has been incorporated into a total station. In the case of a total station, in addition to the optical system of the automatic collimation device 40 and the optical system of the telescope described above, an optical system of an electric distance meter is provided. The optical system of the electric distance meter is composed of a light emitting unit 60 for measuring distance, a beam splitter 62, a dichroic prism 64, the object lens 41, a light receiving element 66, and a reference light path 68 that directly guides the light for measuring distance from the light emitting unit 60 for measuring distance to the light receiving element 66. Although collimation axes O of these optical systems are all constructed as an identical axis, the electric distance meter may be separated from the automatic collimation device and collimation optical system, and collimation axes of these may be provided above and below in parallel. Here, since the electric distance meter is the same as that of a conventional one, description thereof is omitted.

In the automatic collimation device 40, when the telescope stands still, principles that the microcomputer 32 detects a target position and carries out automatic collimation are the same as those disclosed in the above-described Patent Document 1. When the telescope is rotating, in the automatic collimation device 40, principles that the microcomputer 32 detects a target position and carries out automatic collimation will be described next based on FIG. 5.

Figure 5A:
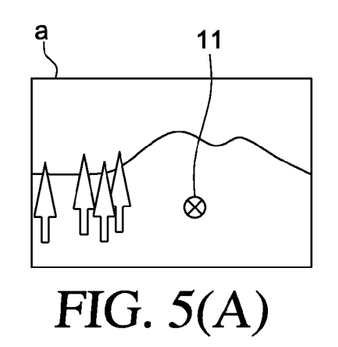
[FIG. 5] Views for explaining principles of the automatic collimation device.
Figure 5B:
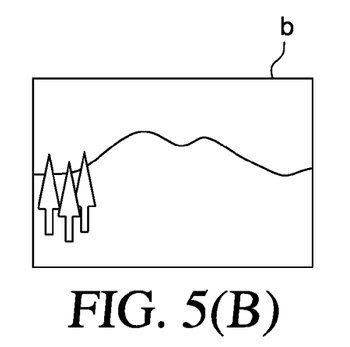
Figure 5C:
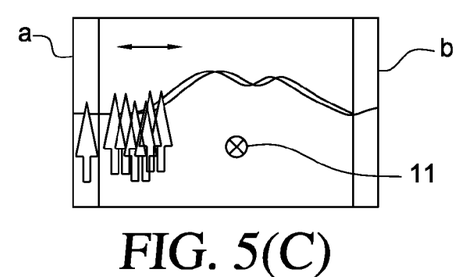
Figure 5D:
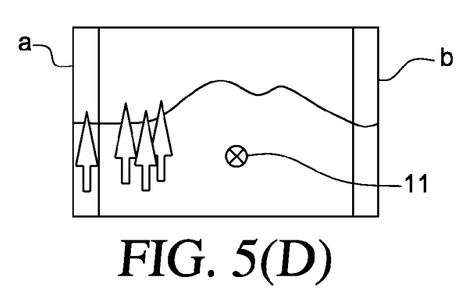
Figure 6:
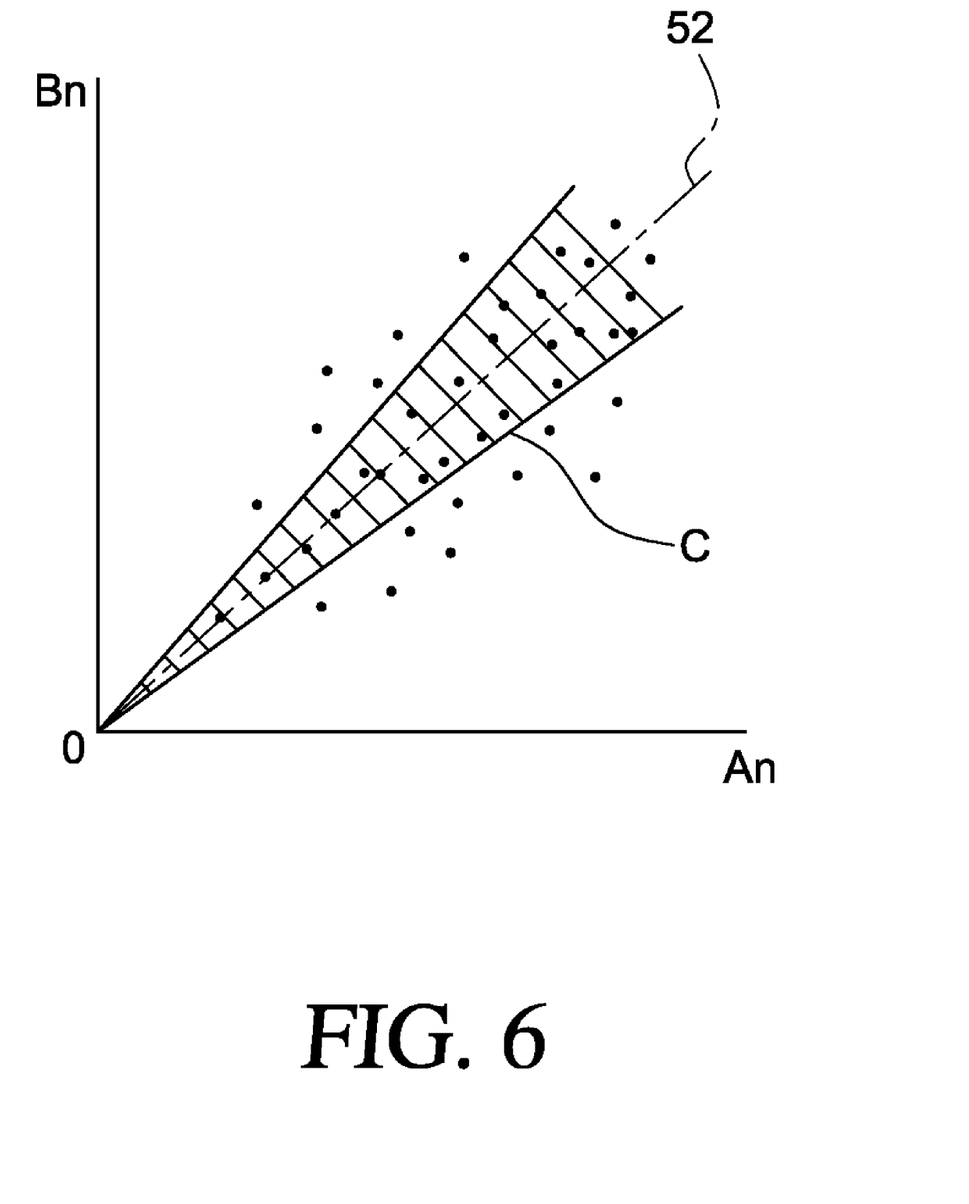
[FIG. 6] A diagram for explaining a correlation.

First, a lit image a (see FIG. 5(A)) when the light emitting unit 24 is made to emit light and an unlit image b (see FIG. 5(B)) when the light emitting unit 24 is turned off are obtained from the imaging device 20. Since the surveying apparatus is rotating, there is a shift between both images a and b. Here, while shifting one of both images a and b little by little as shown in FIG. 5(C), with regard to the respective brightnesses An and Bn (n is a number given to the pixels) of the overlapping pixels 50 between both images a and b, a correlation is determined by a correlation operation. When the brightnesses An and Bn are plotted on the transverse axis and longitudinal axis, respectively, a correlation diagram shown in FIG. 6 is obtained. In the correlation diagram, the greater the correlation becomes, the more the points indicating the brightnesses An and Bn are concentrated in the vicinity of one upward sloping straight line 52 to the right. When both images a and b are made coincident as shown in FIG. 5(D), the correlation is maximized.

In order to automatically determine the correlation, a correlation coefficient is used. In both images a and b, where mean brightnesses of the overlapping pixels 50 between both images a and b are provided as Am and Bm, respectively, standard deviations of the overlapping pixels 50 between both images a and b are provided as As and Bs, respectively, and the total number of the overlapping pixels 50 between both images a and b is provided as N, a correlation coefficient r is determined by the following expression.

$$r = \Sigma\{(An-Am)(Bn-Bm)\}/N \div (As \cdot Bs)$$

In FIG. 5(C), one of both images a and b is shifted only in one (transverse direction) of the longitudinal and transverse directions, however, in actuality, after finding a position where the correlation coefficient between both images a and b is maximized while shifting one of both images a and b in one of the longitudinal and transverse directions, a point where the correlation coefficient between both images a and b is maximized is found out while shifting one of both images a and b also in another direction of the longitudinal and transverse directions.

Figure 5E:
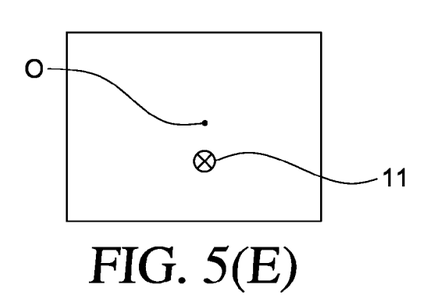

Therefore, when the correlation coefficient between both images a and b has been maximized, by determining a difference between both images a and b at this position, only the target 11 can be extracted as shown in FIG. 5(E). Thereafter, in the same manner as the one disclosed in the above-described Patent Document 1, a horizontal deviation H and a vertical deviation V from the center of the display unit 22 indicating a collimation axis O direction are determined, and the target 11 can be automatically collimated.

However, for determining the position where the correlation coefficient is maximized, it is unnecessary to determine the correlation coefficient across a range from a point where both images a and b are entirely overlapped until both images are no longer overlapped at all. This is because rotation speeds (indicated by the pixel number of the area sensor 20) of the respective servo motors of the horizontal drive unit 28 and vertical drive unit 30 conform to a control signal from the microcomputer 32, the shift amount between both images a and b can be estimated from a time difference T when the image a when the light emitting unit 24 has been made to emit light is obtained and when the image b when the light emitting unit 24 has been turned off is obtained and rotation speed set values of the servo motors. Accordingly, it is sufficient to determine the correlation coefficient between both images a and b while shifting one within a limited range where the shift amount of both images a and b from each other is estimated.

Figure 7A:
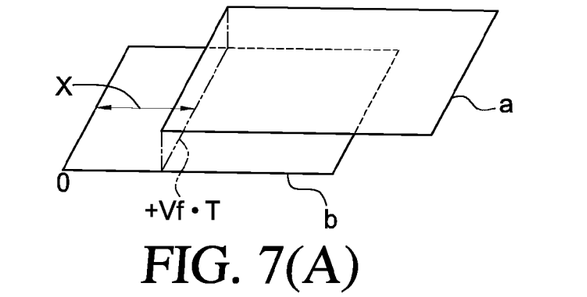
[FIG. 7] Views for explaining a method for determining a range by which a lit image and an unlit image are shifted when carrying out a correlation operation of both images.

If the rotation speed set values of the servo motors are raised from 0 (stop) to a maximum rotation speed +Vf on the positive side, the shift amount X between both when the correlation coefficient between both images a and b is maximized is within 0 to +Vf·T. Accordingly, as shown in FIG. 7(A), it is sufficient to determine the correlation coefficient within a limited range where the shift amount X from each other is 0 to +Vm·T while shifting, both in the longitudinal and transverse directions, one of both images a and b.

Figure 7B:
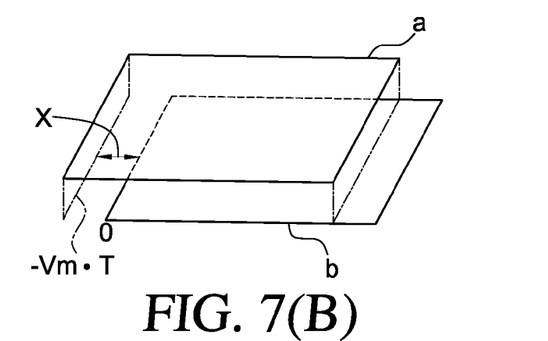

If the rotation speed set values of the servo motors extend from a medium speed −Vm on the negative side to 0 (stop), the shift amount X between both when the correlation coefficient between both images a and b is maximized is within −Vm·T to 0. Accordingly, as shown in FIG. 7(B), it is sufficient to determine the correlation coefficient within a limited range where the shift amount X from each other is −Vm·T to 0 while shifting, both in the longitudinal and transverse directions, one of both images a and b.

Figure 7C:
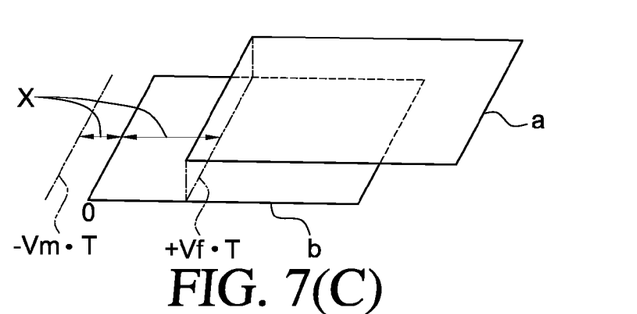

If the rotation speed set values of the servo motors extend from the maximum rotation speed +Vf on the positive side to the medium speed −Vm on the negative side, the shift amount X between both when the correlation coefficient between both images a and b is maximized is within −Vm·T to +Vf·T. Accordingly, as shown in FIG. 7(C), it is sufficient to determine the correlation coefficient within a limited range where the shift amount X from each other is −Vm·T to +Vf·T while shifting, both in the longitudinal and transverse directions, one of both images a and b.

Figure 7D:
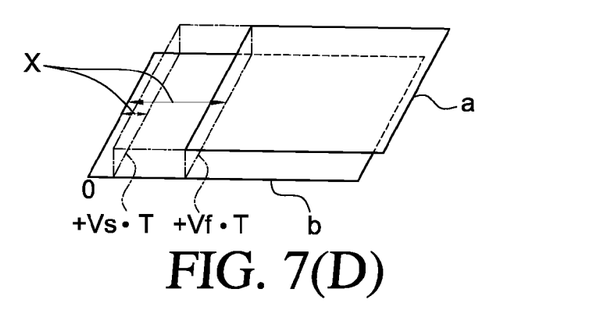

If the rotation speed set values of the servo motors are changed in a complicated manner within a certain time and the maximum rotation speed and the minimum rotation speed within the time are +Vf and Vs, respectively, the shift amount X between both when the correlation coefficient between both images a and b is maximized is within +Vs·T to +Vf·T. Accordingly, as shown in FIG. 7(D), it is sufficient to determine the correlation coefficient within a limited range where the shift amount X from each other is +Vs·T to +Vf·T while shifting, both in the longitudinal and transverse directions, one of both images a and b.

As in the above, according to the automatic collimation device 40 of the present invention, since it is unnecessary to determine the angle of rotation of the telescope when both images a and b have been obtained, even for any type of surveying apparatus such as a surveying apparatus without angle detectors such as encoders, it becomes possible, by including the automatic collimation device 40, to carry out automatic collimation even in a condition where the telescope is rotating. Moreover, since the correlation coefficient is determined within a limited range where the shift amount X between both images a and b is estimated, a position where the correlation coefficient is maximized can be determined in a short time, thus speedy automatic collation is also possible.

Next, based on FIG. 8, description will be given of a second embodiment of the present invention. FIG. 8 are views for explaining principles of an automatic collimation device of the present embodiment. The automatic collimation device also has the same configuration as that of the surveying apparatus according to the first embodiment, and the operation until a lit image a (see FIG. 8(A)) when the light emitting unit 24 has been made to emit light and an unlit image b (see FIG. 8(B)) when the light emitting unit 24 has been turned off are obtained from the imaging device 20 is the same as that of the first embodiment. However, as described in the following, the present invention is different from the first embodiment in the method for a correlation operation to determine a position where both images a and b are most coincident.

Figure 8A:
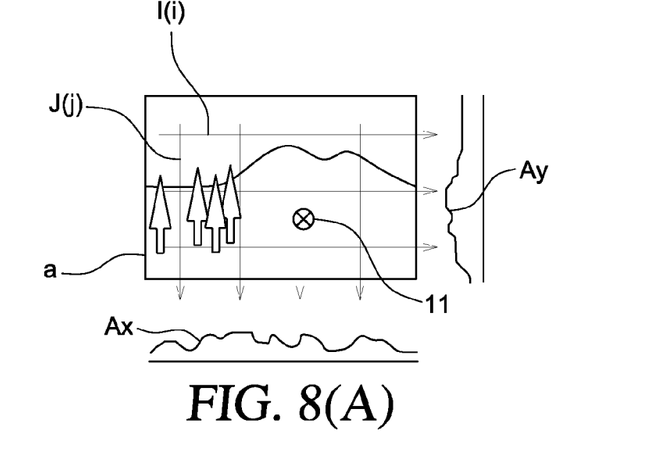
[FIG. 8] Views for explaining principles of an automatic collimation device for a surveying apparatus, which is a second embodiment of the present invention.
Figure 8B:
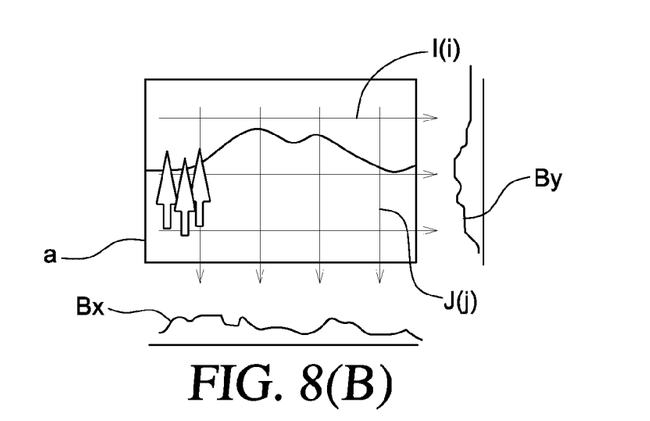

After both images a and b have been obtained as shown in FIGS. 8(A) and (B), in overlapping parts between both images a and b, respectively, the sum totals Ax and Bx of brightness of all pixels are determined with respect to each row j on a straight line J along the longitudinal direction, and the sum totals Ay and By of brightness of all pixels are determined with respect to each line i on a straight line I along the transverse direction.

Figure 8C:
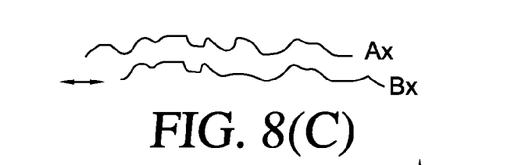

Next, as shown in FIG. 8(C), while shifting one of both images a and b little by little in the transverse direction, a correlation coefficient with regard to the sum totals Ax and Bx of brightness of each overlapping row j between both images a and b is determined. When the correlation coefficient with regard to the sum totals Ax and Bx of brightness has been maximized, it can be judged that it is when both images a and b are most coincident in terms of the transverse direction.

Figure 8D:
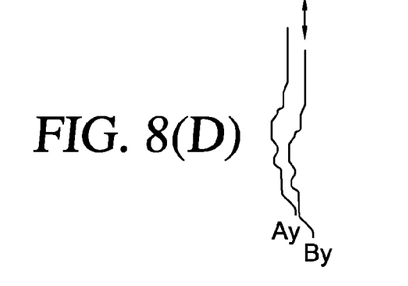

Next, as shown in FIG. 8(D), while shifting one of both images a and b little by little in the longitudinal direction, a correlation coefficient with regard to the sum totals Ay and By of brightness of each overlapping line i between both images a and b is determined. When the correlation coefficient with regard to the sum totals Ay and By of brightness has been maximized, it can be judged that it is when both images a and b are most coincident in terms of the longitudinal direction. Thereafter, in the same manner as that of the first embodiment, the target 11 can be automatically collimated.

According to the present invention, since the correlation coefficients with regard to the sum totals of brightness of the pixels 50 of each line i and each row j has been determined, a point where both images a and b are most coincident can be determined with less computational complexity than that of the first embodiment in which the correlation coefficient with regard to brightness of all pixels 50 is determined, thus automatic collimation can be more speedily carried out.

Figure 9:
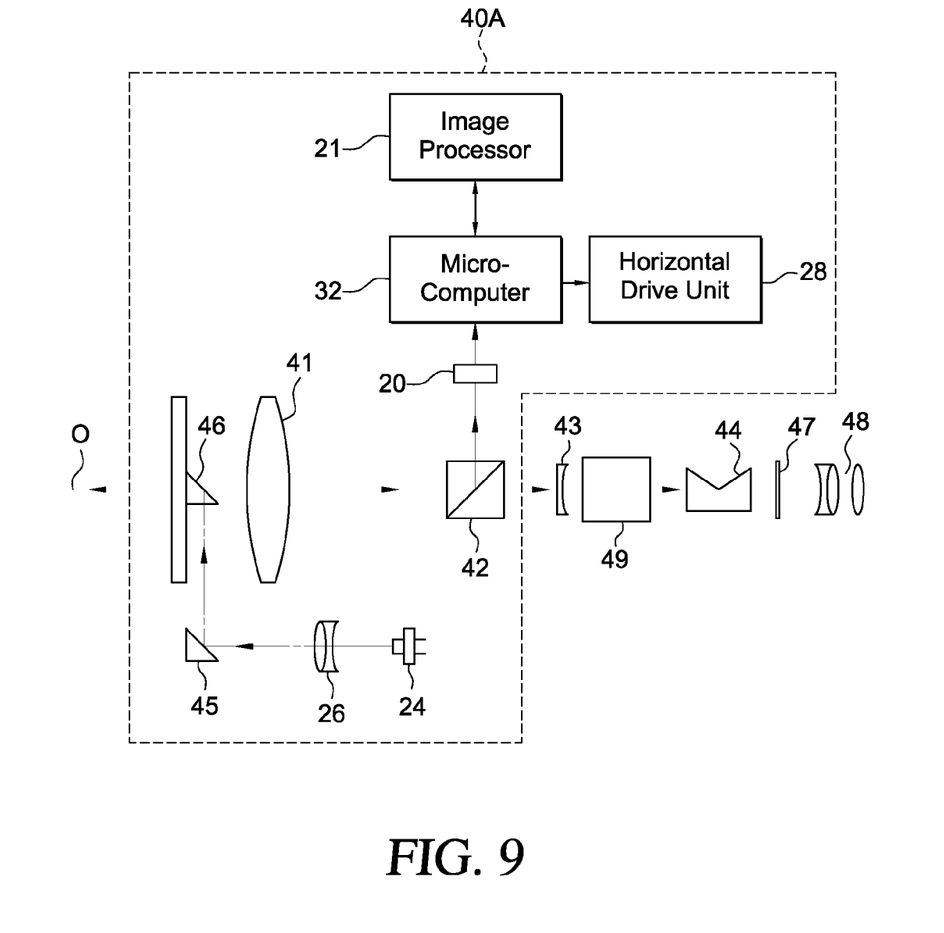
[FIG. 9] An optical system for which an automatic collimation device of a third embodiment of the present invention has been incorporated into an automatic level.
Figure 10:
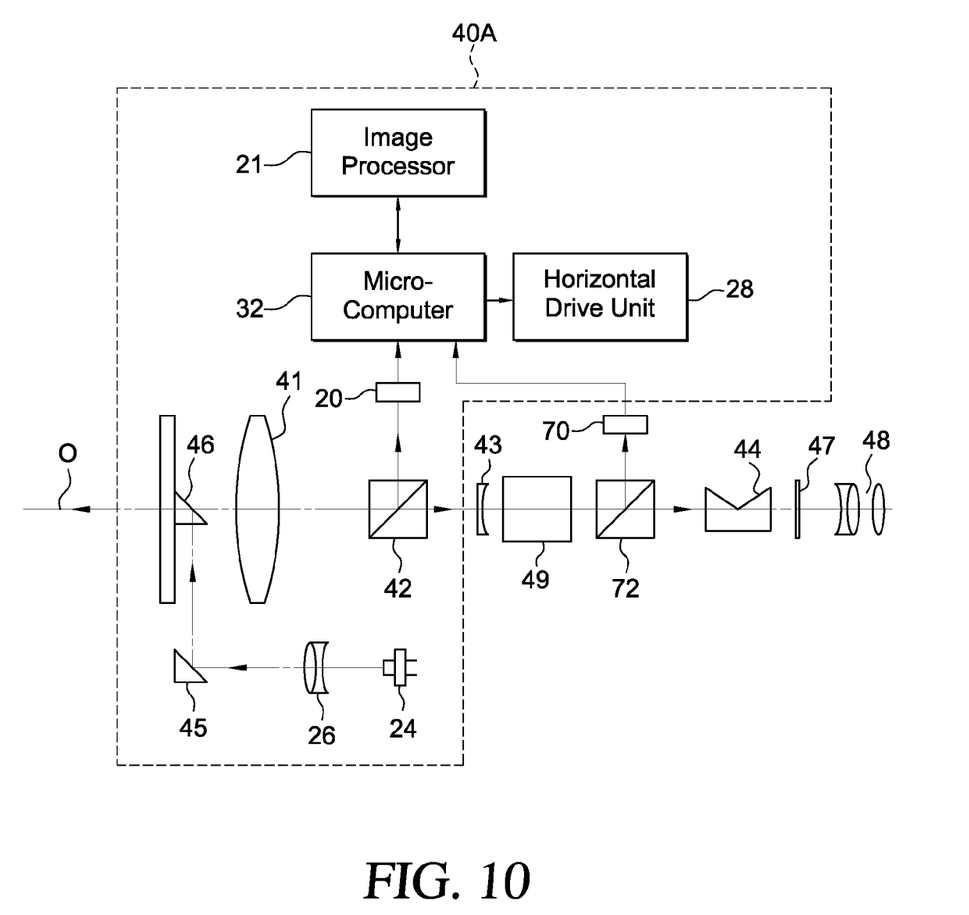
[FIG. 10] An optical system for which an automatic collimation device of a third embodiment of the present invention has been incorporated into an electronic level.

Next, description will be given of an automatic collimation device of a surveying apparatus according to a third embodiment of the present invention. FIG. 9 is a diagram for explaining an optical system for which the automatic collimation device has been incorporated into an automatic level (automatic leveling instrument). FIG. 10 is a diagram for explaining an optical system for which the automatic collimation device has been incorporated into an electronic level.

When the automatic collimation device 40A is incorporated into the automatic level, as shown in FIG. 9, an automatic horizontal compensation mechanism 49 that compensates levelness of the collimation axis O is added, however, since it is unnecessary to rotate the telescope in the up-and-down direction, the vertical drive unit 30 is omitted. Other components are the same as those of the automatic collimation device 40 shown in FIG. 2. This makes it possible to automatically collimate a staff (leveling rod) while compensating levelness of the collimation axis O, even when the telescope is rotating, without the necessity of both horizontal and vertical encoders.

When the automatic collimation device 40A is incorporated into the automatic level, as shown in FIG. 10, in comparison with the components shown in FIG. 9, a line sensor 70 connected to the microcomputer 32 and a dichroic prism 72 that reflects light along the collimation axis O toward the line sensor 70 are added. Other components are the same as those shown in FIG. 9. This makes it possible to automatically collimate a staff (leveling rod) while compensating levelness of the collimation axis O, and furthermore, it allows focusing an image of the staff placed at a survey point on the line sensor 70 and reading a scale of the staff by the microcomputer 32.

As in the above, the automatic collimation device 40A of the present embodiment does not include angle detectors such as encoders but includes the automatic horizontal compensation mechanism 49 and is used exclusively for an automatic level or an electronic level for which it is unnecessary to rotate the telescope in the up-and-down direction. Similar to the above-described embodiments, the automatic collimation device 40A of the present embodiment can also carry out automatic collimation even in a condition where the telescope is rotating.

However, the present invention is not limited to the above-described embodiments and can be modified in various forms. For example, in the above-described respective embodiments, as the correlation operation to determine a point where both images a and b are most coincident, the point has been determined by the correlation coefficient between both images a and b, however, it may be determined by another appropriate method.

For example, the position where both images a and b are most coincident may be determined based on a position where the ratio that points indicating the respective brightnesses An and Bn of the overlapping pixels 50 are positioned within a predetermined range C is maximized in the correlation diagram shown in FIG. 6. In addition, a residual correlation method for determining the same based on a position where the sum of squares of a difference between the brightnesses An and Bn takes a minimum value may be used. Furthermore, a phase-only correlation method (Fourier phase correlation method) for determining the same based on a position where the degree of similarity at a phase part is maximized as a result of a frequency analysis of the brightnesses An and Bn may be used.

| Description of Symbols | |
|---|---|
| 11 | Target |
| 20 | Area sensor (imaging device) |
| 25 | Light emitting unit |
| 28 | Horizontal drive unit (drive unit) |
| 30 | Vertical drive unit (drive unit) |
| 32 | Microcomputer (arithmetic control unit) |
| 40, 40A | Automatic collimation device |
| 50 | Pixel |
| a | Lit image |
| b | Unlit image |

What is claimed is:

1. An automatic collimation device for a surveying apparatus comprising: an imaging device that images a target captured by a telescope and surroundings of the target; a drive unit that rotates the telescope; a light emitting unit that sends light toward the target; a microcomputer electrically connected to the drive unit, and an arithmetic control unit connected to the microcomputer that determines a position of the target based on a difference between a lit image of the target obtained as a result of imaging by the imaging device when the light emitting unit has been turned on and an unlit image of the target obtained as a result of imaging by the imaging device when the light emitting unit has been turned off and controls the drive unit to automatically collimate the target without the need for a horizontal and vertical angle detectors, wherein the arithmetic control unit carries out a correlation operation between the lit image and unlit image so as to determine a position where both images are most coincident, by instructing the microcomputer to operate the drive unit to move the telescope in a direction wherein the brightness of overlapping pixels between the lit image and unlit image increases, and to stop the drive unit when the brightness of overlapping pixels is maximized whereupon the target image is collimated, and determines a position of the target based on a difference between both images at the position where both images are most coincident while the drive unit rotates the telescope, and wherein the correlation operation is carried out while shifting either the lit image or unlit image, and the amount to be shifted during this time is limited to multiple shift distances determined by a control signal transmitted from the arithmetic control unit to the drive unit, wherein the arithmetic control unit iteratively computes different multiple shift distances as said lit and unlit images correlate.

2. The automatic collimation device for a surveying apparatus according to claim 1, wherein the position where both images are most coincident is judged to be when, in the course of a correlation operation between the lit image and unlit image in a transverse direction to determine, in overlapping parts between both images, a correlation regarding a sum total of brightness of overlapping pixels on a straight line along a longitudinal direction between both images, the correlation has been maximized.

3. The automatic collimation device for a surveying apparatus according to claim 1, wherein the position where both images are most coincident is judged to be when, in the course of a correlation operation between the lit image and unlit image in a longitudinal direction to determine a correlation regarding a sum total of brightness of overlapping pixels on a straight line along a transverse direction between both images, the correlation has been maximized.

4. The automatic collimation device for a surveying apparatus according to claim 1, wherein said control signal varies a speed of said drive unit to achieve said different shift distances.

5. The automatic collimation device for a surveying apparatus according to claim 1, wherein said iteratively computed different multiple shift distances are progressively smaller.

* * * * *